United States Patent [19]

Aono et al.

[11] Patent Number: 5,359,710
[45] Date of Patent: Oct. 25, 1994

[54] METHOD AND APPARATUS FOR PROGRAMMING AN AUTOMATIC MONITORING SYSTEM

[75] Inventors: Masato Aono, Nagaokakyo; Yoshitaka Mitsunobu, Toyonaka, both of Japan

[73] Assignee: Omron Corporation, Kyoto, Japan

[21] Appl. No.: 474,998

[22] Filed: Feb. 5, 1990

[30] Foreign Application Priority Data

Feb. 3, 1989 [JP] Japan .................................. 1-26378

[51] Int. Cl.⁵ ............................................. G06F 15/62
[52] U.S. Cl. .................................... 395/155; 395/103; 395/133; 395/425
[58] Field of Search ............... 395/103, 140–143, 395/155, 135, 425, 133

[56] References Cited

U.S. PATENT DOCUMENTS

| 4,533,997 | 8/1985 | Furgerson | 395/425 |
| 4,912,657 | 3/1990 | Saxton et al. | 395/155 |
| 4,970,666 | 11/1990 | Welsh et al. | 395/123 |
| 5,150,458 | 9/1992 | Masuzaki et al. | 395/135 |

Primary Examiner—Heather R. Herndon
Assistant Examiner—Almis Jankus
Attorney, Agent, or Firm—Dickstein, Shapiro & Morin

[57] ABSTRACT

A method and apparatus for programming an automatic monitoring system which includes an auxiliary input device for inputting encoded picture data relating to the picture classification, coordinate information, picture attributes, etc. for graphic plotting, a picture data filing device for filing input picture data from the auxiliary input device, a high-level language data filing device for filing high-level language data. A programming unit having a machine language transformation unit for transforming high-level language data into machine language data, the programming unit including a high-level language transformation unit for transforming the picture data filed in the picture data filing device into basic graphic plotting instruction sentences of the high-level language in accordance with high-level language transformation rules.

4 Claims, 11 Drawing Sheets

FIG.1

| | | | |
|---|---|---|---|
| FIRST PATTERN | PICTURE CLASSIFICATION | | 01 (LINE) |
| | COORDINATE VALUE | START POINT X-COORDINATE (X1)<br>START POINT Y-COORDINATE (Y1)<br>END POINT X-COORDINATE (X2)<br>END POINT Y-COORDINATE (Y2) | 50<br>100<br>150<br>200 |
| | PICTURE ATTRIBUTE | COLOR (COL) | 1 (BLUE) |
| SECOND PATTERN | PICTURE CLASSIFICATION | | 02 (CONTINUOUS LINE) |
| | COORDINATE VALUE | START POINT X-COORDINATE (X1)<br>START POINT Y-COORDINATE (Y1)<br>SECOND POINT X-COORDINATE (X2)<br>SECOND POINT Y-COORDINATE (Y2)<br>THIRD POINT X-COORDINATE (X3)<br>THIRD POINT Y-COORDINATE (Y3)<br>FOURTH POINT X-COORDINATE (X4)<br>FOURTH POINT Y-COORDINATE (Y4)<br>FIFTH POINT X-COORDINATE (X5)<br>FIFTH POINT Y-COORDINATE (Y5)<br>END POINT X-COORDINATE (X6)<br>END POINT Y-COORDINATE (Y6) | 250<br>200<br>300<br>150<br>350<br>200<br>400<br>150<br>450<br>200<br>500<br>150 |
| | PICTURE ATTRIBUTE | COLOR (COL) | 2 (RED) |
| THIRD PATTERN | PICTURE CLASSIFICATION | | 03 (SQUARE) |
| | COORDINATE VALUE | START POINT X-COORDINATE (X1)<br>START POINT Y-COORDINATE (Y1)<br>END POINT X-COORDINATE (X2)<br>END POINT Y-COORDINATE (Y2) | 35<br>250<br>200<br>305 |
| | PICTURE ATTRIBUTE | COLOR (COL) | 3 (PURPLE) |

FIG. 2A

| | | | |
|---|---|---|---|
| FOURTH PATTERN | PICTURE CLASSIFICATION | | 04 (POLYGON) |
| | COORDINATE VALUE | START POINT X-COORDINATE (X1)<br>START POINT Y-COORDINATE (Y1)<br>SECOND POINT X-COORDINATE (X2)<br>SECOND POINT Y-COORDINATE (Y2)<br>THIRD POINT X-COORDINATE (X3)<br>THIRD POINT Y-COORDINATE (Y3)<br>FOURTH POINT X-COORDINATE (X4)<br>FOURTH POINT Y-COORDINATE (Y4)<br>FIFTH POINT X-COORDINATE (X5)<br>FIFTH POINT Y-COORDINATE (Y5)<br>SIXTH POINT X-COORDINATE (X6)<br>SIXTH POINT Y-COORDINATE (Y6)<br>SEVENTH POINT X-COORDINATE (X7)<br>SEVENTH POINT Y-COORDINATE (Y7) | 255<br>250<br>300<br>300<br>250<br>350<br>300<br>400<br>350<br>355<br>350<br>300<br>300<br>250 |
| | PICTURE ATTRIBUTE | COLOR (COL) | 4 (GREEN) |
| FIFTH PATTERN | PICTURE CLASSIFICATION | | 05 (ARC) |
| | COORDINATE VALUE | CENTER POINT X-COORDINATE (X1)<br>CENTER POINT Y-COORDINATE (Y1) | 450<br>300 |
| | PICTURE ATTRIBUTE | RADIUS (R)<br>START ANGLE (ANG1)<br>END ANGLE (ANG2)<br>COLOR (COL) | 50<br>270°<br>360°<br>5 (LIGHT BLUE) |
| SIXTH PATTERN | PICTURE CLASSIFICATION | | 06 (SECTOR) |
| | COORDINATE VALUE | CENTER POINT X-COORDINATE (X1)<br>CENTER POINT Y-COORDINATE (Y1) | 500<br>300 |
| | PICTURE ATTRIBUTE | RADIUS (R)<br>START ANGLE (ANG1)<br>END ANGLE (ANG2)<br>COLOR (COL) | 50<br>0°<br>90°<br>6 (YELLOW) |
| SEVENTH PATTERN | PICTURE CLASSIFICATION | | 07 (SEMICIRCLE) |
| | COORDINATE VALUE | CENTER POINT X-COORDINATE (X1)<br>CENTER POINT Y-COORDINATE (Y1) | 450<br>450 |
| | PICTURE ATTRIBUTE | RADIUS (R)<br>START ANGLE (ANG1)<br>END ANGLE (ANG2)<br>COLOR (COL) | 50<br>270°<br>90°<br>6 (YELLOW) |

FIG. 2B

| | | | |
|---|---|---|---|
| EIGHTH PATTERN | PICTURE CLASSIFICATION | | 08 (CIRCLE) |
| | COORDINATE VALUE | CENTER POINT X-COORDINATE (X1) | 100 |
| | | CENTER POINT Y-COORDIANTE (Y1) | 400 |
| | PICTURE ATTRIBUTE | RADIUS (R) | 50 |
| | | COLOR (COL) | 7 (WHITE) |
| NINTH PATTERN | PICTURE CLASSIFICATION | | 09 (CHARACTER) |
| | COORDINATE VALUE | START POINT X-COORDINATE (X1) | 200 |
| | | START POINT Y-COORDINATE (Y1) | 415 |
| | PICTURE ATTRIBUTE | CHARACTER STRING (STRING) | "OMRON" |
| | | COLOR (COL) | 1 (BLUE) |
| TENTH PATTERN | PICTURE CLASSIFICATION | | 10 (FILL-OUT) |
| | COORDINATE VALUE | FILL-OUT X-COORDINATE (Z1) | 138 |
| | | FILL-OUT Y-COORDINATE (Y1) | 275 |
| | PICTURE ATTRIBUTE | BORDER COLOR (COL1) | 3 (PURPLE) |
| | | COLOR (COL2) | 2 (RED) |

FIG. 2C

| PICTURE CLASSIFICATION | INSTRUCTION STRING | PARAMETER |
|---|---|---|
| LINE (01) | LINE | X1 Y1 X2 Y2 COL |
| CONTINUAL LINE (02) | POLYLINE | X1 Y1 X2 Y2 ........Xn Yn COL |
| SQUARE (03) | SQUARE | X1 Y1 X2 Y2 COL |
| POLYGON (04) | POLYGON | X1 Y1 X2 Y2........Xn Yn COL |
| ARC (05) | ARC | X1 Y1 R ANG1 ANG2 COL |
| SECTOR (06) | SECTOR | X1 Y1 R ANG1 ANG2 COL |
| SEMICIRCLE (07) | SEMICIRC | X1 Y1 R ANG1 ANG2 COL |
| CIRCLE (08) | CIRCLE | X1 Y1 R COL |
| CHARACTER (09) | SYMBOL | X1 Y1 STRING COL |
| FILL-OUT (10) | PAINT | X1 Y1 COL1 COL2 |

FIG. 3

| FIRST PATTERN | LINE (50, 100, 150, 200, 1) |
|---|---|
| SECOND PATTERN | POLYLINE (250, 200, 300, 150, 350, 200, 400, 150, 450, 200, 500, 150, 2) |
| THIRD PATTERN | SQUARE (55, 250, 200, 305, 3) |
| FOURTH PATTERN | POLYGON (255, 250, 300, 300, 250, 350, 300, 400, 350 355, 350, 300, 300, 250, 4) |
| FIFTH PATTERN | ARC (450, 300, 50, 270, 360, 5) |
| SIXTH PATTERN | SECTOR (500, 300, 50, 0, 90, 6) |
| SEVENTH PATTERN | SEMICIRC (450, 450, 50, 270, 90, 6) |
| EIGTH PATTERN | CIRCLE (100, 400, 50, 7) |
| NINTH PATTERN | SYMBOL (200, 415, "OMRON", 1) |
| TENTH PATTERN | PAINT ( 135, 275, 3, 2) |

METHOD AND APPARATUS FOR PROGRAMMING AN AUTOMATIC MONITORING SYSTEM

BACKGROUND OF THE INVENTION

1. Field of the Invention

The present invention relates to a programming device which finds application in the integrated use of a user control program and a graphic program plotting program prepared using an auxiliary input means such as a mouse.

2. Brief Description of the Related Art

Generally in an automatic monitoring system used for the monitor and control of various equipment in a building, production plant or the like, the process flow, wiring system and so on are displayed on the cathode-ray-tube display and the operational status of the equipment is monitored and controlled by reference to the display on the CRT screen. For the device used in such a system, the user prepares a control program as well as the picture data necessary for graphic plotting for the various constituent elements of the equipment (such as the power source, circuit breakers, etc.) and keep on file the picture data together with the control program. Then, if a fault or trouble is detected by any sensor installed in the production line, the above-prepared picture data are read out during execution of the control program and linked to the control program and the part of the display at the position corresponding to the location of the fault is rewritten, for instance, so as to allow the fault to be identified.

To generate such a graphic output, it might be contemplated to prepare program instruction words of the high-level language anew and execute them but it is troublesome to, inter alia, decide on a suitable format. Therefore, it is common practice to use an auxiliary input means such as a mouse or a track ball.

Figure 8:
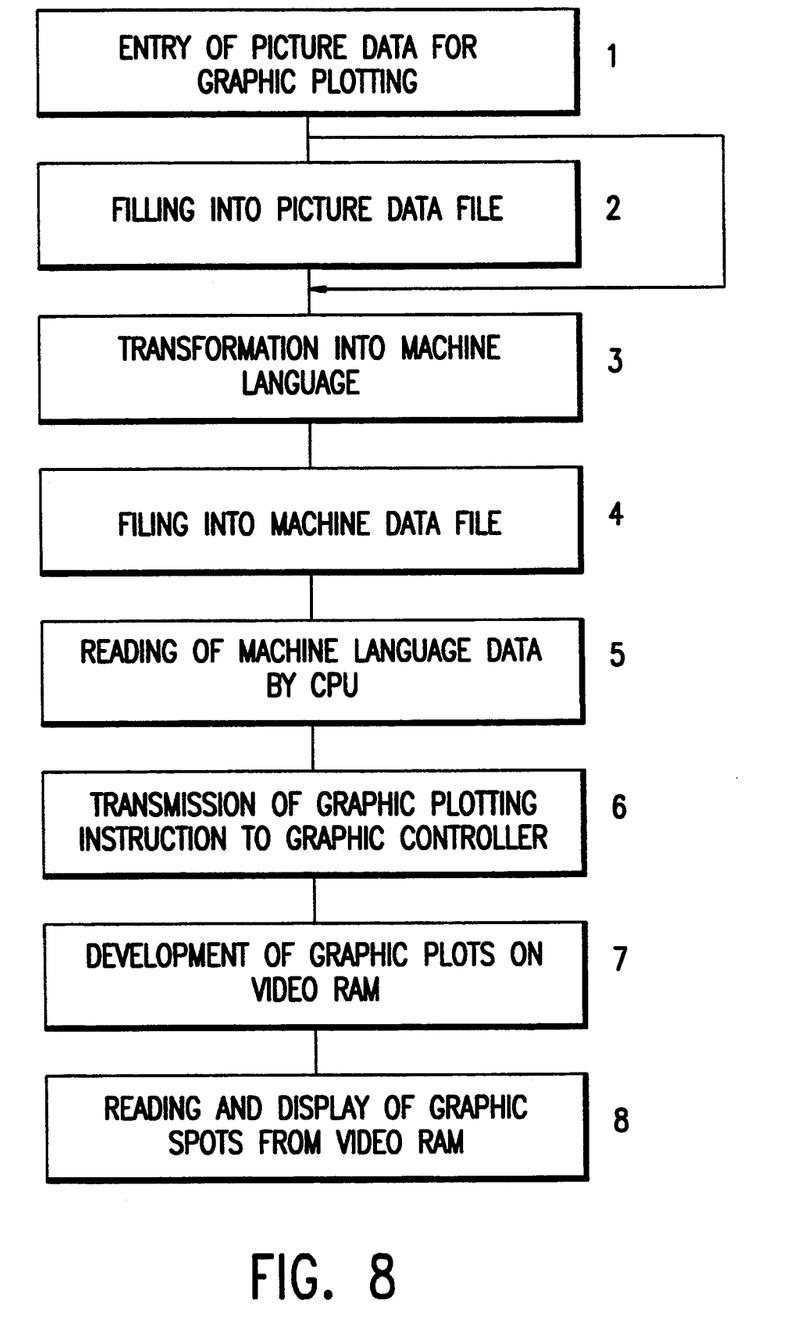
FIG. 8 is a flow chart showing the related art procedure for graphic plotting.

The procedure for generation of a graphic output using such an auxiliary input means is as follows. As illustrated in FIG. 8, the auxiliary input means is manipulated to serially input encoded picture data relating to the basic picture classification, e.g. a line or a circle, and coordinate values designating the start and end points of the basic picture unit (Step 1). The respective picture data are filed in a picture data file (Step 2) and, then, are translated by an interpreter into the machine language (Step 3). The machine language data are then serially filed in a machine language data file (Step 4). For display of a graphic output, a CPU reads out the filed picture data from the machine data file, processes them (Step 5) and transmits a graphic plotting instruction to a graphic controller (Step 6).

Based on this instruction, the graphic controller develops the graphic output on a video RAM (Step 7). The content of this video RAM is displayed on a CRT display secreen (Step 8).

In this system, every time a picture data for graphic plotting is entered by an auxiliary input means, such as a mouse, it is transformed into a machine language data as mentioned above. This presents the problem that the user cannot partially modify the graphic output or reuse it effectively. Thus, in order to modify any part of the graphic output, the picture data must be modified but the picture data from the auxiliary input means have already been transformed into machine language data which are difficult to read. Moreover, in order to modify the content of the display at the position of a trouble as it is required in the above-mentioned automatic monitoring system, the picture data must be linked to the control program but since the language levels are dissimilar, an exclusive program for linking them is additionally required. Thus, the device has a drawback in use.

OBJECTS AND SUMMARY OF THE INVENTION

It is an object of the present invention to provide a programming device so that the input picture data for graphic plotting from an auxiliary input means are automatically filed and basic graphic plotting instruction sentences of a high-level language are automatically composed according to the filed picture data to thereby facilitate the execution of a change of the graphic display or linking of the picture data to the user program written in the high-level language.

To accomplish the above-mentioned object, the programming device of the present invention comprises an auxiliary input means for inputting encoded picture data relating to the picture classification, coordinate information, picture attributes, etc. for graphic plotting, a picture data filing means for filing the input picture data from said auxiliary input means, a high-level language data filing means for filing high-level language data, for example written in BASIC or C language, and a programming unit equipped with a machine language transformation means for transforming said high-level language data into machine language data, said programming unit including a high-level language transformation means for transforming the picture data filed in said picture data filing means into basic graphic plotting instruction sentences of the high-level language in accordance with a predetermined set of high-level language transformation rules. In a preferred embodiment, the present invention provides a programming device of the above basic construction wherein said high-level language transformation means comprises a language transformation table memory storing the transformation rules relating to the instruction sentences for transforming encoded picture data into high-level language data, parameter sequence, etc. and a high-level language composer for composing basic graphic plotting instruction sentences of the high-level language from the picture data in accordance with said transformation rules.

In the above construction, the input picture data for graphic plotting from the auxiliary input means are first filed in the picture data filing means. The filed picture data are then transformed, by the high-level language transformation means, into basic graphic plotting instruction sentences of the high-level language in accordance with said high-level language transformation rules.

Particularly in the embodiment wherein said high-level language means comprises a language transformation table memory and a high-level language composer, the high-level language composer refers itself to the transformation rules covering the high-language transformation instruction sentence and parameter sequence registered in the language transformation table memory and composes basic graphic plotting instruction sentences of the high-level language from the picture data in accordance with said transformation rules.

BRIEF DESCRIPTION OF THE DRAWINGS

The above and other objects, advantages and features of this invention will be more fully understood when considered in conjunction with the accompanying drawings, in which.

DETAILED DESCRIPTION OF THE PREFERRED EMBODIMENT

Figure 1:
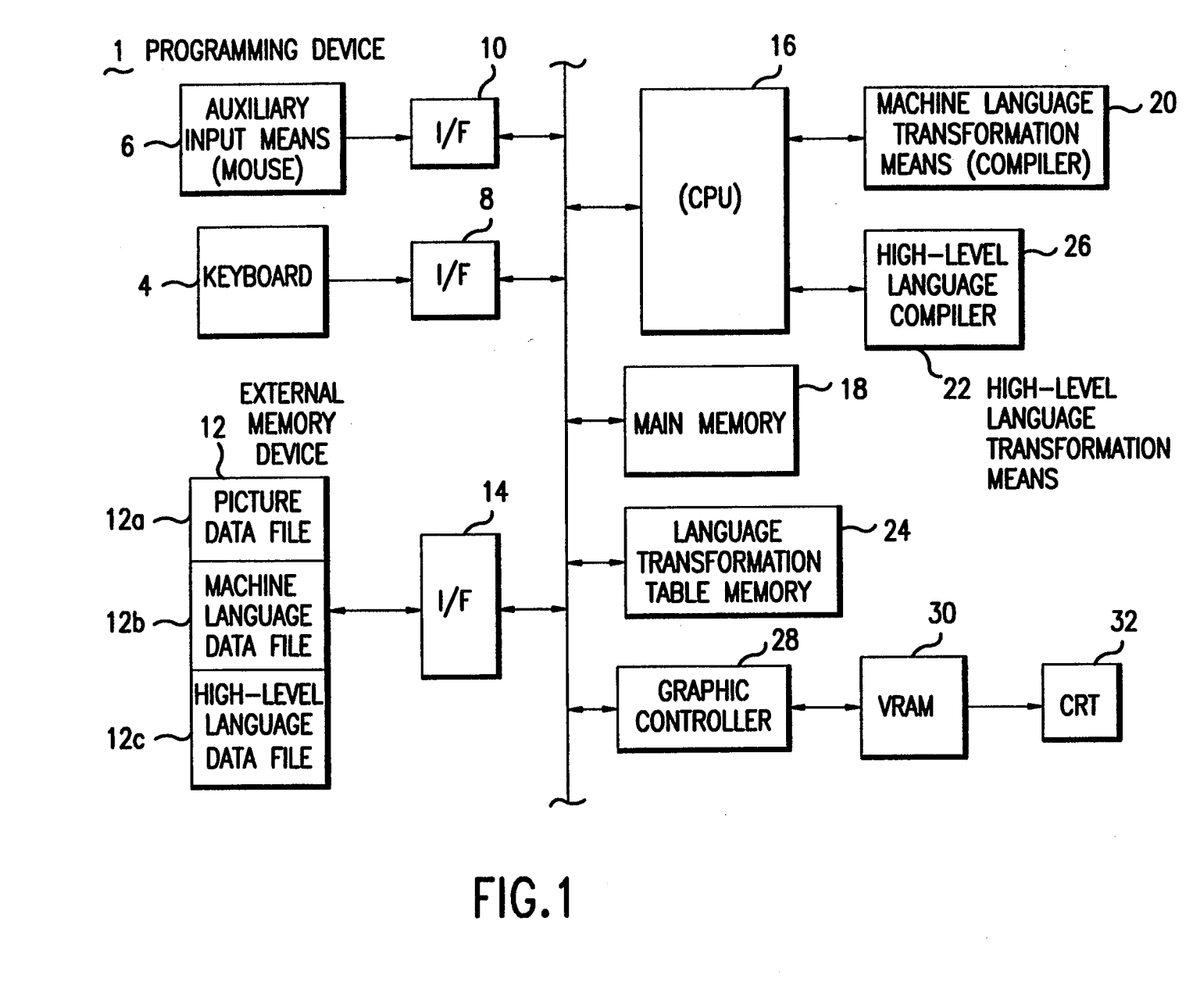
FIG. 1 is a block diagram showing the overall construction of the programming device according to the invention.

FIG. 1 is a block diagram showing the overall construction of a programming device embodying the principle of the invention. The programming device, generally indicated at 1, includes a keyboard 2 and an auxiliary input means 4 which may, for example, be a mouse or a track ball and by means of which the user may input encoded graphic data such as the picture classification, coordinate values, picture attributes and so on. Indicated by 8 and 10 are interfaces. The numeral 12 represents an external memory device, such as a floppy-disk, which has a picture data file 12a for storage of the input picture data (FIG. 2) from the auxiliary input means, a machine language data file 12b for storage of machine language data, and a high-level language data file 12c for storage of the data written in the high-level language which may, for example, be BASIC or C language. Indicated by 14 is an interface with said external memory device 12. The reference numeral 16 represents a central processing unit (CPU), while a main memory is indicated at 18.

The reference numeral 20 represents a machine language transformation means including a compiler, an interpreter and other devices for transforming the picture data and high-level language data, which are stored in the picture data file 12a and high-level language data file 12c all of said external memory device 12, into machine language data. The reference numeral 22 represents a high-level language transformation means which reads out picture data from the picture data file 12a and converts them to basic instruction sentences of the high-level language for graphic plotting in accordance with a predetermined set of high-level language transformation rules. In this embodiment, it consists of a language transformation table memory 24 which contains the transformation rules relating to instruction sentences for transformation of encoded picture data to high-level language data, parameter sequences, etc. (FIG. 3) and a high-level language composer 26 for composing basic graphic plotting instructions of the high-level language from the picture data in accordance with said transformation rules (FIG. 4).

The reference numeral 28 represents a graphic controller, and a video RAM and a color cathode-ray-tube (CRT) display are indicated by the numerals 30 and 32, respectively.

Figure 2A:
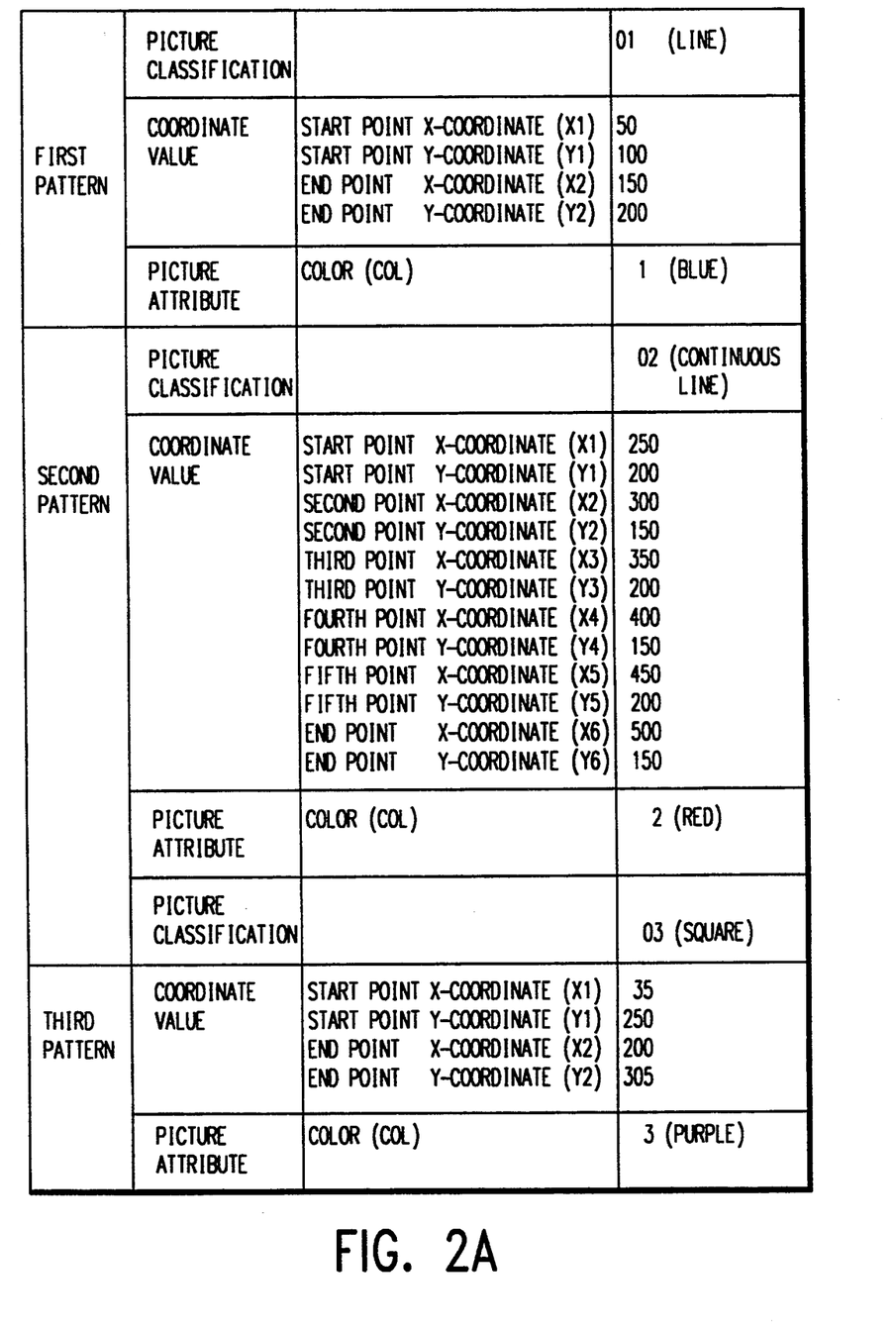
FIGS. 2(a)–2(c) are a memory map for the picture data filing means.
Figure 2B:
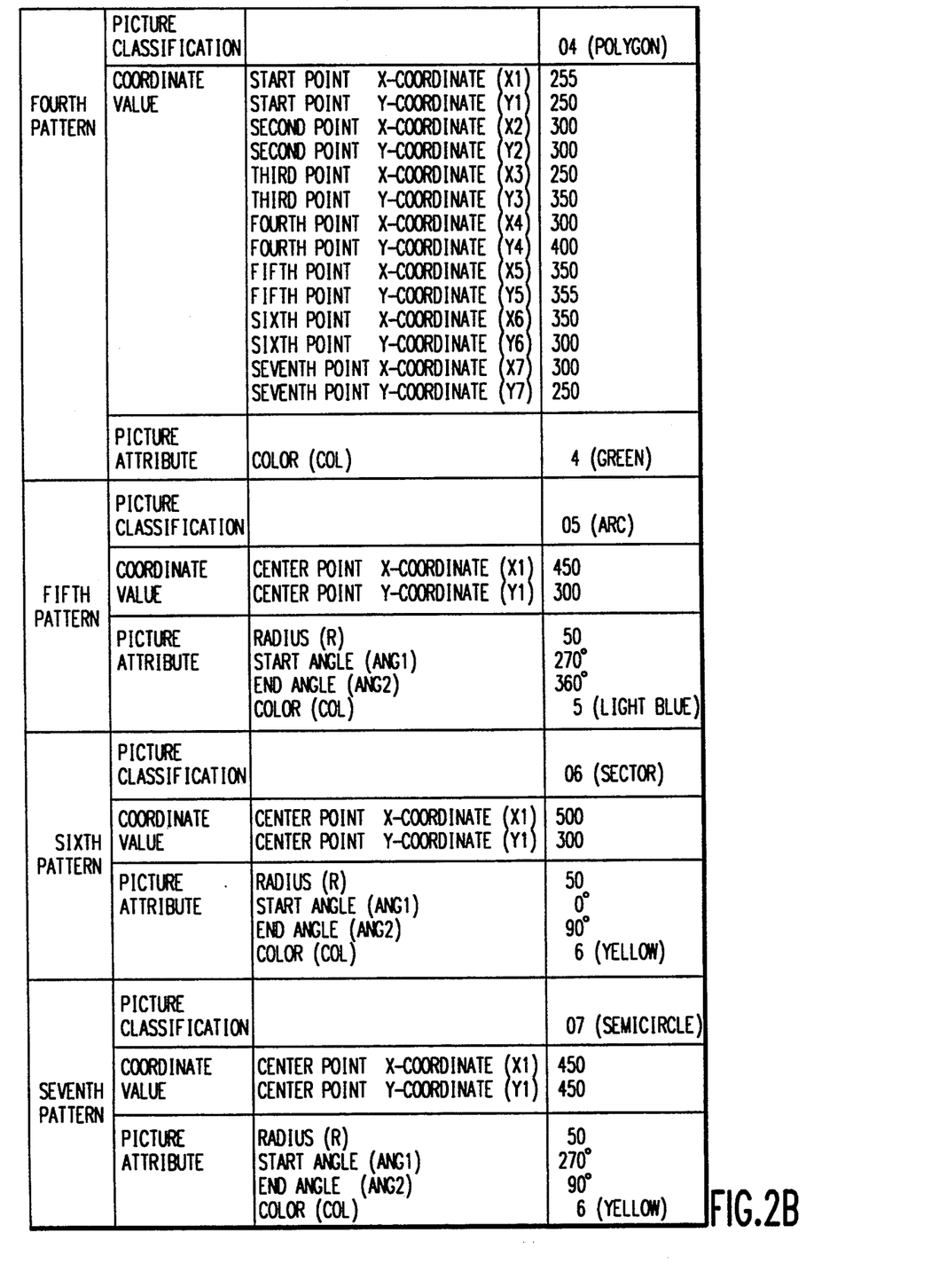
Figure 2C:
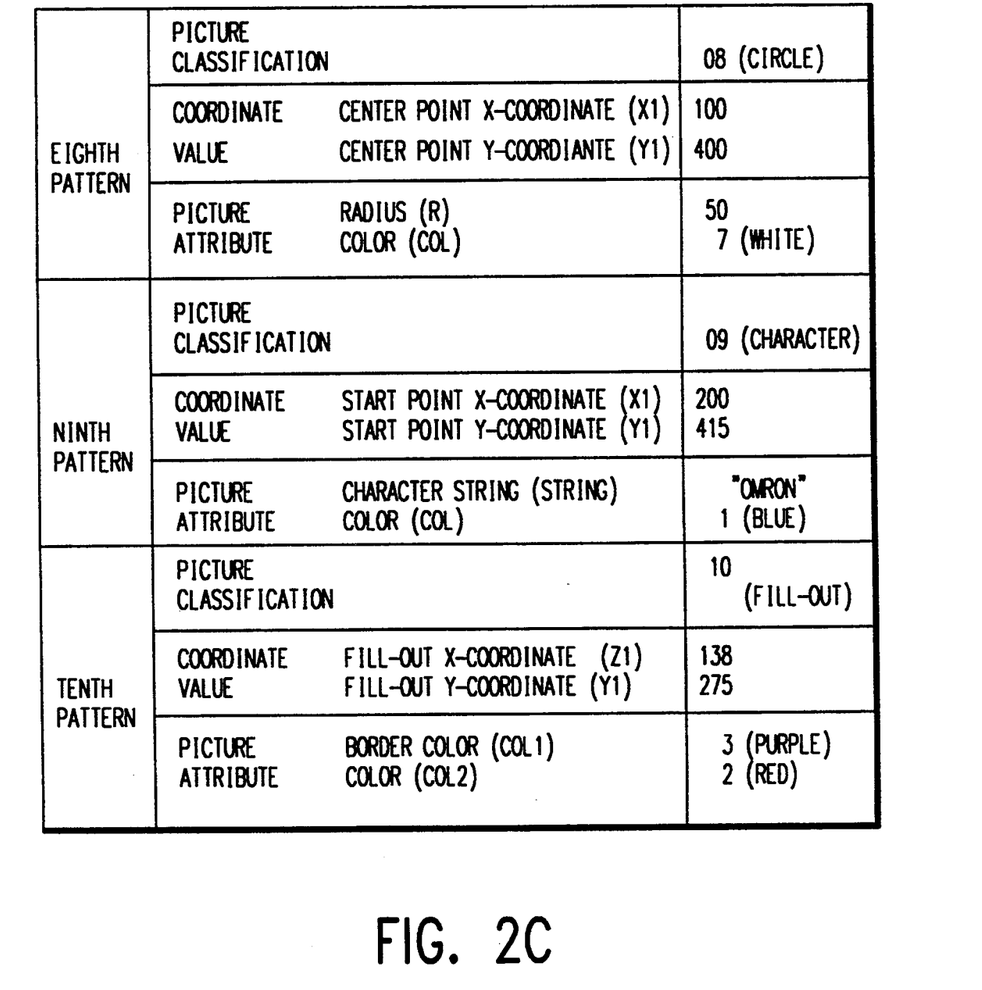

Referring to FIG. 2, a picture classification is made by assigning codes to various basic patterns as follows:

| | | | |
|---|---|---|---|
| Straight line: | 01 | Continual line: | 02 |
| Square: | 03 | Polygon: | 04 |
| Arc: | 05 | Sector: | 06 |
| Semicircle: | 07 | Circle: | 08 |
| Character: | 09 | Fill-out: | 10 |

With regard to color data, the following codes are respectively assigned to different colors.

| | | | | | |
|---|---|---|---|---|---|
| Blue: | 1 | Red: | 2 | Purple: | 3 |
| Green: | 4 | Light blue: | 5 | Yellow: | 6 |
| White: | 7 | | | | |

Fill-out means that a closed area surrounded by a certain border color, including a fill-out point, is filled out with a drawing color.

Figure 3:
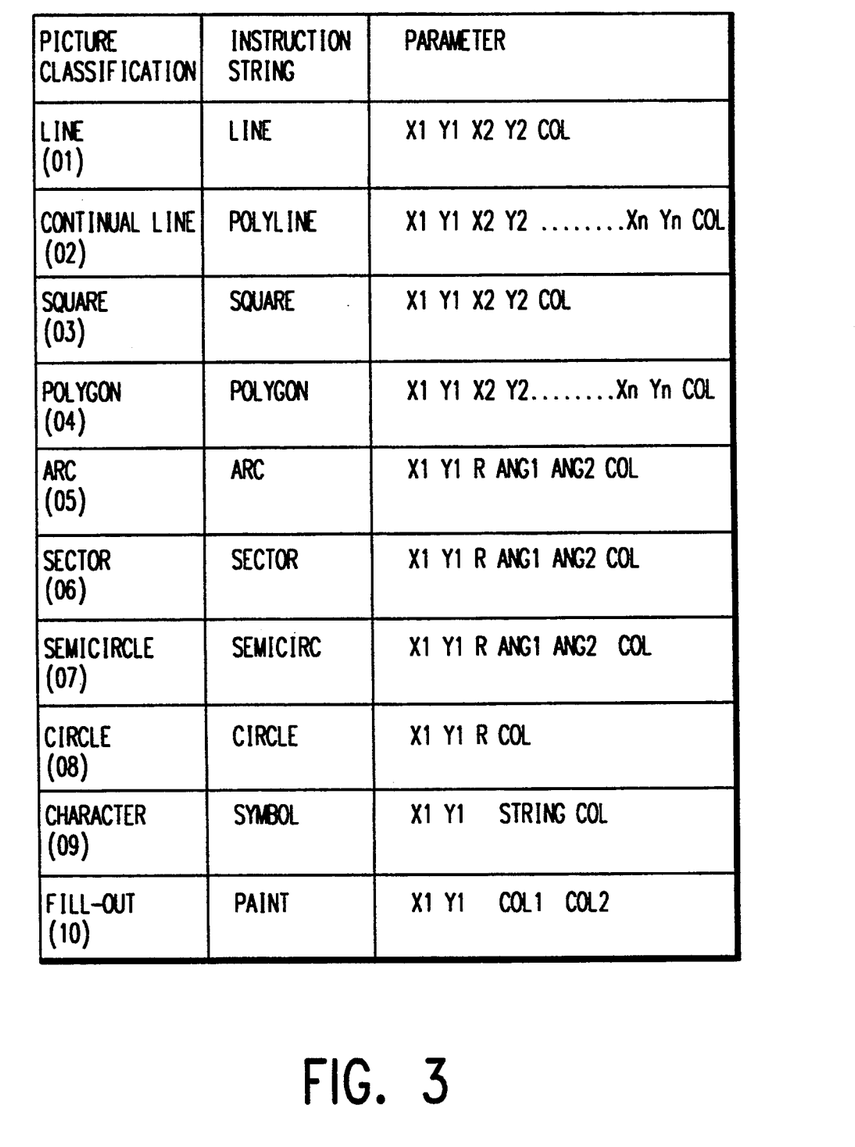
FIG. 3 is a memory map showing the transformation rules registered in a language transformation table memory.
Figure 4:
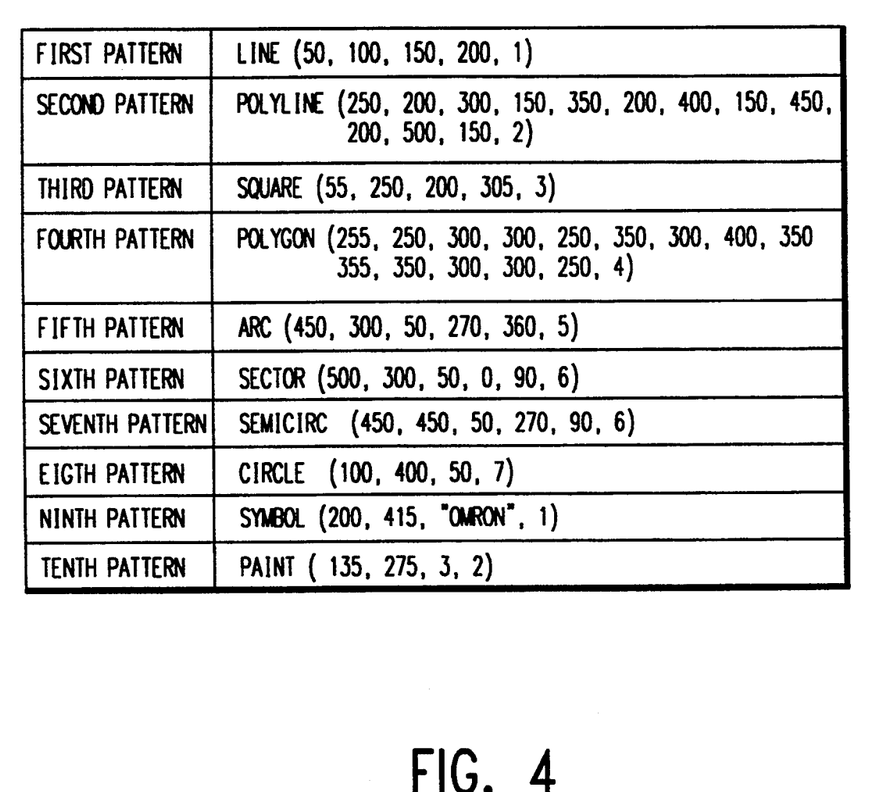
FIG. 4 is a memory map for a high-level language data filing means.

Referring to FIG. 3, the above-mentioned parameters X1, Y1 ..., R, COL, ANG1, ANG2, etc. correspond to those shown in FIG. 2.

The actions of the above programming device are explained below referring to FIGS. 2, 3, 4, 5, 6 and 7.

Figure 7:
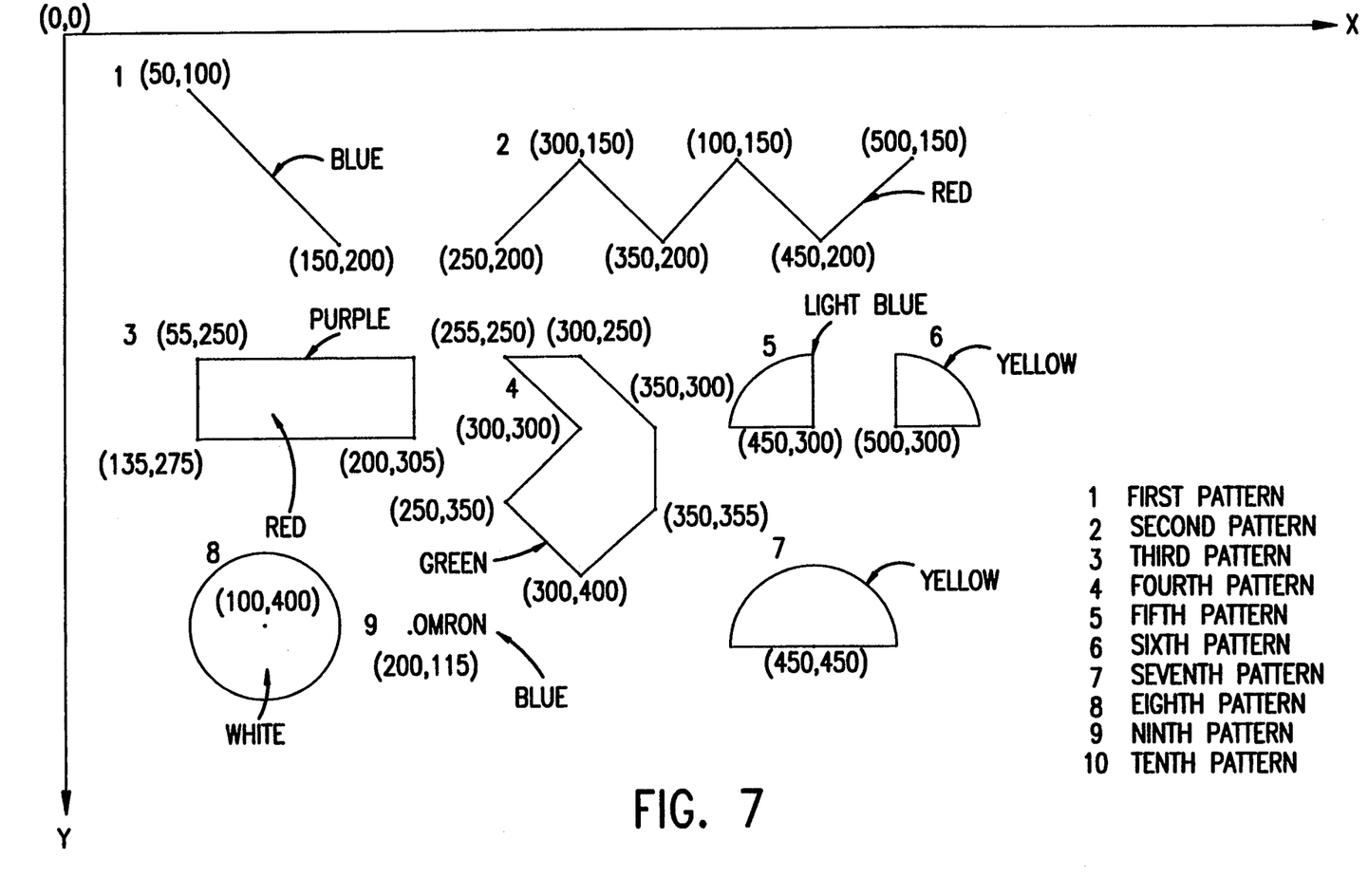
FIG. 7 is a diagrammatic representation of the sequence in which picture data are filed.

Graphic plotting is performed using basic picture units, such as lines, circles, squares, arcs, characters, etc., each as a discrete unit. Thus, the encoded picture data representing the picture classification, e.g. a line or a circle, start, end coordinate values and picture attributes such as drawing color, radius, start angle, end angle, etc. are entered from said auxiliary input means 6 on a basic picture unit basis (Step 1, FIG. 2). The input picture data are first filed in the main memory 18 through the interface 10 and CPU 16. The CPU 16 transmits a plurality of the picture data thus stored in the main memory 18 as a unit to the external memory device 12 where they are stored in its picture data file 12a (Step 2). Therefore, as illustrated in FIG. 2, the encoded picture classification, picture attribute and coordinate values are filed, by picture unit, in the picture data file 12a. When, as shown in FIG. 7, for example, a picture was drawn in the order of the straight line, continual line, square, polygon, arc, sector, semicircle, circle, character and fill-out, the respective basic pattern data are stored in the picture data file as shown in FIG. 2. By way of illustration, the data for a straight line which is a first figure in FIG. 7 are stored in the manner of picture classification "01", start point (X-coordinate) "50", start point (Y-coordinate) "100", end point (X-coordinate) "150", end point (Y-coordinate) "200", and drawing color "1". Basically the same procedure is repeated for the second and subsequent figures. The order of filing the data into the picture data file 12a is not dependent on the specific high-level language of a given machine but is predetermined, for example in the order of picture classification, coordinate values and picture attribute as in the above illustration.

Figure 5:
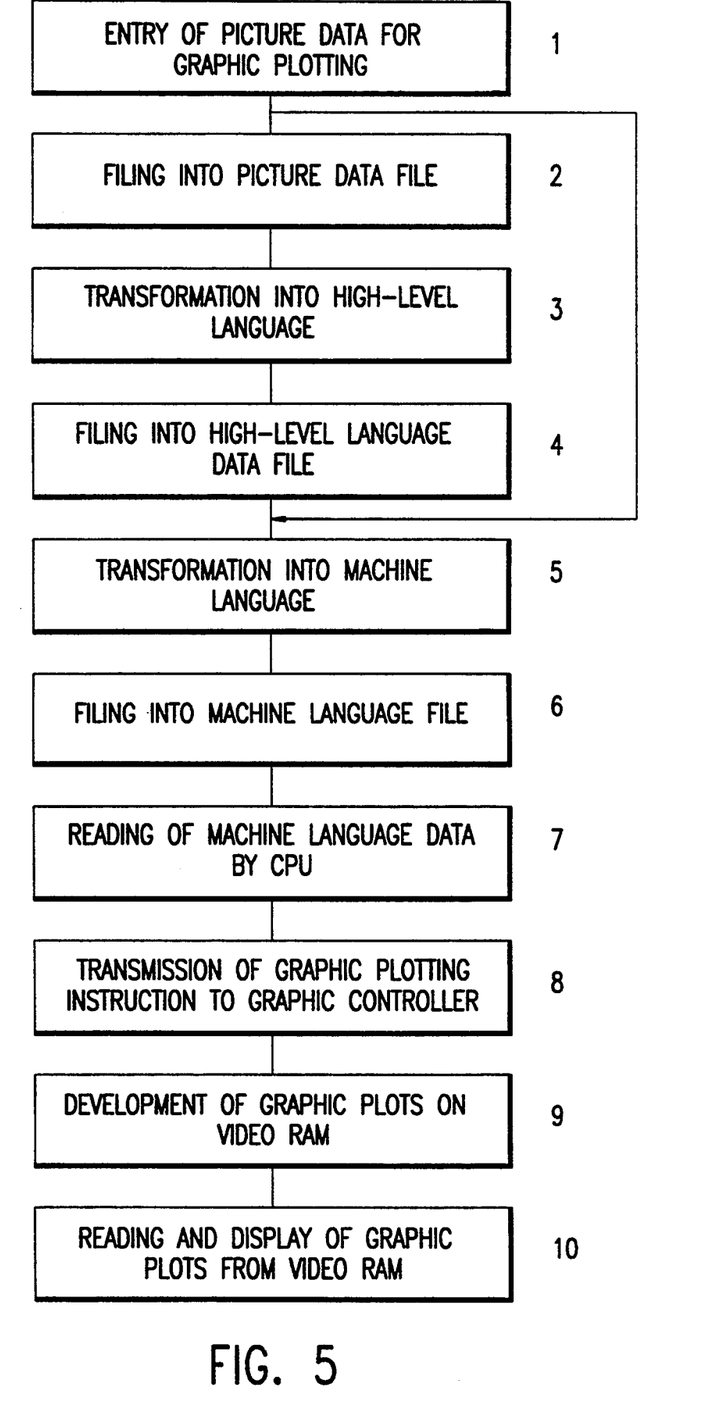
FIG. 5 is a flow chart showing the procedure of graphic plotting in accordance with the invention.

On the other hand, the picture data stored in the main memory 18 are translated into the machine language by the machine language transformation means 20 (Step 5) and filed in the machine language data file (Step 6) in the per se conventional manner. The CPU 16 executes the picture data instruction (Step 7) and feeds the data for graphic plotting to a graphic controller 28 (Step 8). Based on this instruction, the graphic controller 28 develops graphic plots on the video RAM 30 (Step 9), which are then displayed on a color CRT display 32 (Step 10).

Figure 6A:
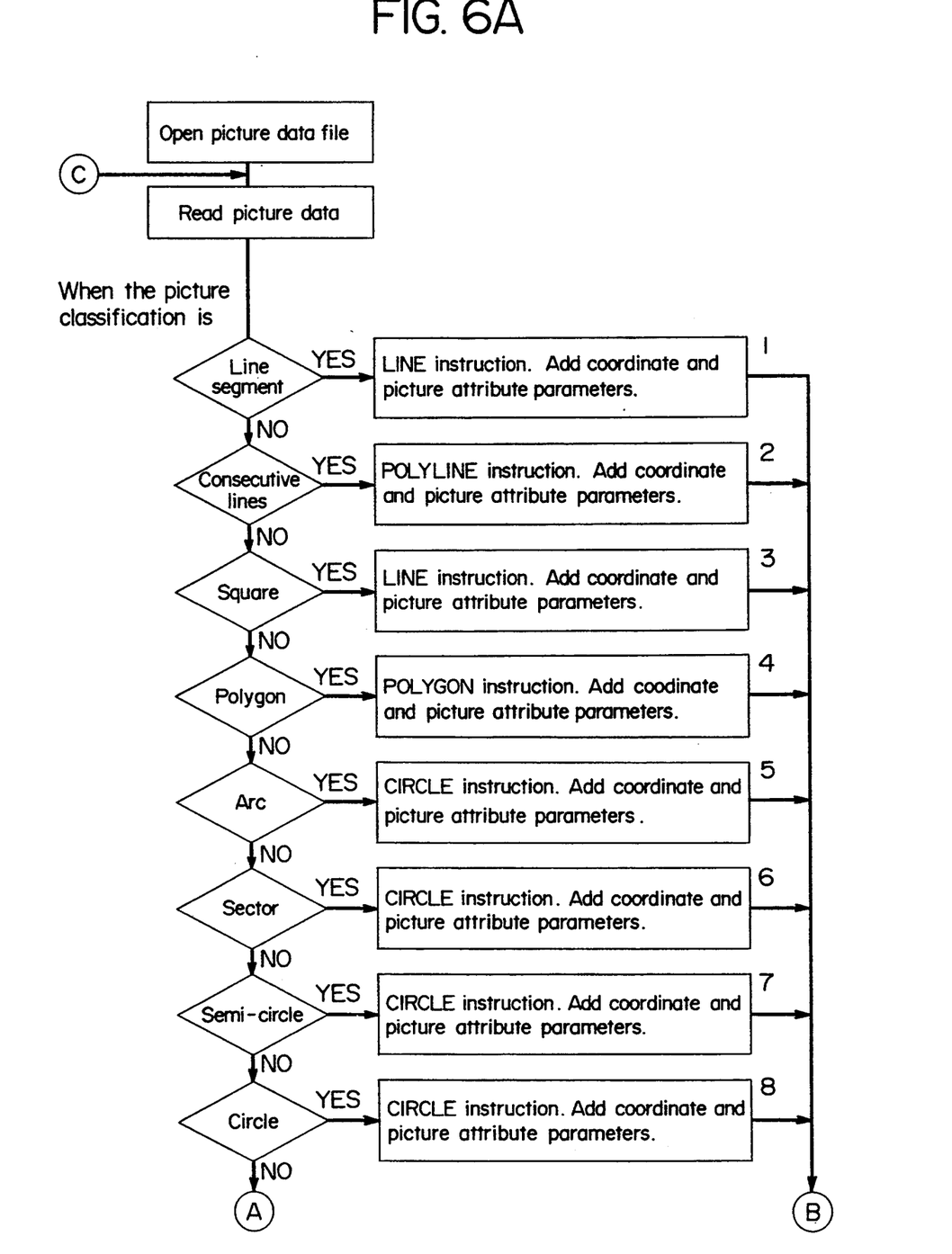
FIG. 6(a) and (b) are flow charts showing versions of the procedure for transformation of data into high-level language data.
Figure 6B:
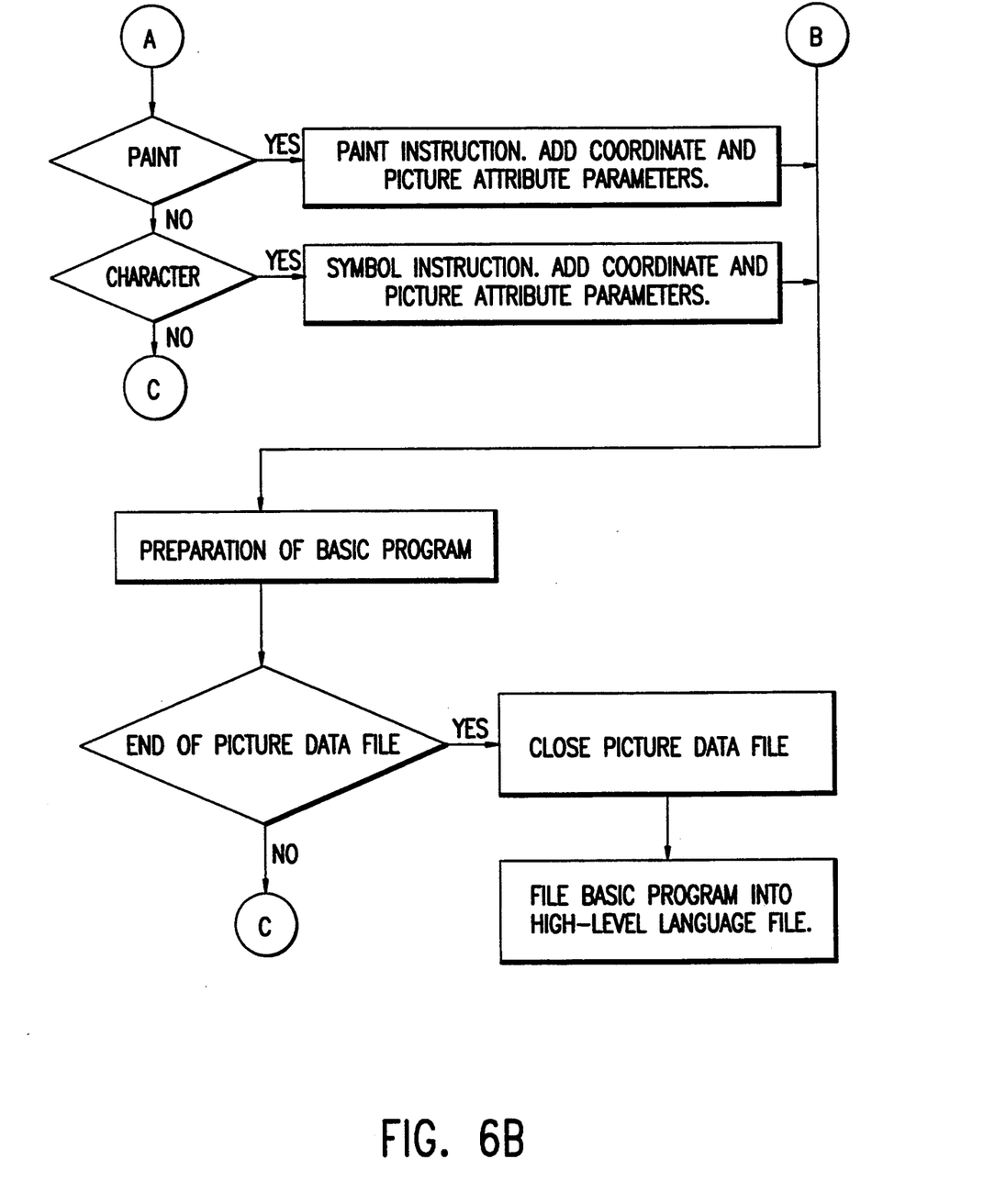

The conversion of the graphic picture drawn up with the auxiliary input means 6 to the high-level language (BASIC and C language in this embodiment) is performed in the following manner (FIG. 6).

In the first place, the CPU 16 accesses the external memory device 12 and reads out the picture data file 12a in basic picture units. Then, the CPU 16 feeds the picture data to the high-level language composer 26. Thereupon, the high-level language composer 26 refers itself to the transformation rules relating to the instruction sentences, parameter sequences shown in FIG. 3, etc. previously registered in the language transformation table memory 24 and transforms the picture data into basic graphic plotting instruction sentences of the high-level language in accordance with the transformation rules (Step 3, FIG. 6). Taking BASIC or C language as an example, an instruction sentence (function in the case of C language) for plotting a straight line must be written as LINE ($X_1$, $Y_1$, $X_2$, $Y_2$, COL) wherein $X_1$, $Y_1$, $X_2$, $Y_2$ are parameters determinative of the start and end points on the X- and Y-coordinates and COL represents a parameter designating the drawing color. Therefore, to configure the instruction string and parameter sequence required, the high-level language composer 26 first judges what is the picture classification code existing in the picture data. If the picture classification code is "01" for a straight line, the matching one is sought from FIG. 3 and the instruction string of "LINE" is composed. Since it is necessary to alter the parameter settings and parameter sequence according to the language, the high-level language composer 26 checks the start X-coordinate of the picture data and if the start X-coordinate code corresponds to "50", sets the parameter immediately following the instruction string "LINE" to "50". It then checks the start Y-coordinate and end X- and Y-coordinates and set the parameters to "100", "150" and "200", respectively. The composer 26 further checks the picture attribute and if its code corresponds to "1" for blue, sets the last parameter to "1". In this manner, the picture data for composing one basic picture (a straight line in this embodiment) stored in the picture data file 12a are transformed into an instruction sentence of BASIC or C language reading LINE (50, 100, 150, 200, 1) and the CPU 16 stores this instruction sentence (function in the case of C language) into the main memory 18. In this manner, the picture data are serially read out from the picture data file 12a and transformed into BASIC instruction sentences down to the end of the file. For the 10 basic patterns shown in FIG. 7, the basic pattern data are read, in blocks, from the pattern data table of FIG. 2 according to the flow shown in FIG. 6 and, by reference to the language conversion table of FIG. 3, transformed into the program shown in FIG. 4. After transformation of all the information in the picture data file 12a into the high-level language, the CPU 16 transmits these instruction sentences of the high-level language from the main memory 18 to the external memory device 12 and stores them into the high-level language data file 12c (Step 4).

The subsequent procedure is the same as the execution of a program written in the ordinary high-level language. Thus, the machine language transformation means 20 translates the high-level language in the high-level language data file 12 into the machine language, and according to machine language instructions, the CPU 16 executes various processing routines. Therefore, when the above LINE (50, 100, 150, 200, 1) as a plotting instruction is executed, a blue line extending from the start point (50, 100) to the end point (150, 200) is displayed on the color CRT screen.

It should be understood that the provision of a language transformation table memory 24, as in the above embodiment, offers the advantage that even if the language used varies from one machine to another, the necessary adaptation can be made by rewriting the contents of the memory storing the transformation rules but when the high-level language of machines is fixed, the object can be accomplished by adapting the high-level language transformation means 22 to execute the routine of FIG. 6 even without provision of the language transformation table memory 24. In such a case, once a decision on a picture classification is made, the subsequent instruction strings and parameter sequence are uniformly determined so that the speed of transformation into the high-level language is increased.

Thus, in accordance with the present invention, the coded picture data for graphic plotting from the auxiliary input means are, as needed, automatically transformed by the high-level language transformation means into basic graphic plotting instruction sentences of the high-level language. Particularly when the language transformation table memory described hereinbefore is provided, the transformation of coded picture data into data of a different language can be accomplished by rewriting the content of the same memory. Therefore, such procedures as a partial modification of the graphic display and linking to the user program written in a high-level language can be easily accomplished. As a result, it is not only possible to generate a graphic display in a shorter time but also possible to handle the graphic output in integration with the user program, thus contributing to the ease of use.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. A programming device, comprising:
   an input means for inputting encoded picture data for graphic plotting,
   a picture data filing means for filing said picture data input from said input means,
   a higher-level language data filing means for filing picture data filed in said picture data filing means in higher-level language data, and
   a programming unit equipped with a machine language transformation means for transforming said higher-level language data into machine language data, said programming unit including a higher-level language transformation means for transforming the picture data filed in said picture data filing means into graphic plotting instructions in said higher-level language in accordance with a predetermined set of higher-level language transformation rules, and wherein said higher-level language transformation means comprises a language transformation table memory storing the transformation rules relating to the instructions for transforming encoded picture data into higher-level language data and parameter sequences, and a higher-level language composer for composing graphic plotting instructions in the higher-level language from the picture data in accordance with said transformation rules.

2. A programming device, comprising:

an input means for inputting encoded picture data for graphic plotting, a picture data filing means for filing said picture data input from said input means, a higher-level language data filing means for filing picture data filed in said picture data filing means in higher-level language data, a programming unit equipped with a machine language transformation means for transforming said higher-level language data into machine language data, said programming unit including a higher-level language transformation means for transforming the picture data filed in said picture data filing means into graphic plotting instructions in said higher-level language in accordance with a predetermined set of higher-level language transformation rules, and wherein said encoded picture data relate to at least one of picture classification, coordinate information, and picture attributes.

3. The programming device of claim 2, wherein the higher-level language transformation means further comprises a language transformation table memory for storing the higher-level language transformation rules.

4. A method of producing a program, comprising the steps of:

inputting encoded picture data for graphic plotting;

filing the input picture data in a picture data filing means;

transforming said input picture data stored in said picture data filing means into graphic plotting instructions in a higher-level language in accordance with a predetermined set of higher-level language transformation rules;

filing said higher-level language data graphic plotting instructions in a higher-level language data filing means;

transforming said higher-level language data graphic plotting instructions into machine language data; and storing said predetermined set of higher-level language transformation rules in a language transformation table memory.

* * * * *